(12) United States Patent
Lippert

(10) Patent No.: US 6,705,280 B1
(45) Date of Patent: Mar. 16, 2004

(54) AIR INTAKE SYSTEM FOR INTERNAL COMBUSTION ENGINE

(75) Inventor: Eduard Lippert, Calberlah (DE)

(73) Assignee: Volkswagen AG, Wolfsberg (DE)

( * ) Notice: Subject to any disclaimer, the term of this patent is extended or adjusted under 35 U.S.C. 154(b) by 0 days.

(21) Appl. No.: 09/913,432

(22) PCT Filed: Jan. 26, 2000

(86) PCT No.: PCT/EP00/00571

§ 371 (c)(1),
(2), (4) Date: Aug. 14, 2001

(87) PCT Pub. No.: WO00/49279

PCT Pub. Date: Aug. 24, 2000

(30) Foreign Application Priority Data

Feb. 20, 1999 (DE) .......................... 199 07 398

(51) Int. Cl.[7] .............................................. F02B 31/00
(52) U.S. Cl. ....................................... 123/306; 123/308
(58) Field of Search ................................. 123/306, 308, 123/188.14

(56) References Cited

U.S. PATENT DOCUMENTS

| | | | | |
|---|---|---|---|---|
| 5,551,392 A | * | 9/1996 | Yamaji et al. | 123/306 |
| 5,632,244 A | * | 5/1997 | Endres et al. | 123/306 |
| 5,878,712 A | * | 3/1999 | Wolters et al. | 123/301 |
| 5,979,401 A | * | 11/1999 | Hickey | 123/306 |
| 6,199,534 B1 | * | 3/2001 | Tokuyasu et al. | 123/301 |

FOREIGN PATENT DOCUMENTS

| | | | |
|---|---|---|---|
| DE | 19754736 | * | 4/1999 |
| EP | 0579860 | * | 1/1994 |
| JP | 58124019 | * | 7/1983 |
| JP | 02125911 | * | 5/1990 |

* cited by examiner

*Primary Examiner*—John Kwon
(74) *Attorney, Agent, or Firm*—Ostrolenk, Faber, Gerb & Soffen, LLP

(57) ABSTRACT

An air intake system for an internal combustion engine. The intake system has a cylinder head delimiting at least one cylinder, an intake manifold which has at least one air passage per cylinder, and at least one intake passage in the cylinder head per cylinder, with an intake port leading into the associated cylinder. The intake manifold has a cylinder head flange connected to the cylinder head so that each air passage of the intake manifold is in fluid-conductive connection with an associated intake passage in the cylinder head. A flap valve is operatively arranged in the air passage so as to constrict a cross section of the air passage of the intake manifold. A partition wall is arranged in the intake passage so as to divide the intake passage over a predetermined distance between the cylinder head flange and the intake port. The flap valve is movable between an open position and a closed position and is configured so as to project over the cylinder head flange so that the flap value strikes the partition wall when it is in the closed position in which the flap valve constricts the cross section of the air passage.

7 Claims, 5 Drawing Sheets

AIR INTAKE SYSTEM FOR INTERNAL COMBUSTION ENGINE

PRIORITY CLAIM

This is a U.S. national stage of application No. PCT/EP00/00571, filed on Jan. 26, 2000. Priority is claimed on that application and on the following application:

Country: Germany, Application No. 199 07 398.8, filed Feb. 20, 1999.

BACKGROUND OF THE INVENTION

The invention pertains to an air intake system for an internal combustion engine, especially for a spark-ignition engine with direct injection, with a cylinder head delimiting at least one cylinder; with an intake manifold, which has at least one air passage per cylinder; and with at least one intake passage in the cylinder head per cylinder. An intake port of the passage leads into the associated cylinder. The intake manifold and the cylinder head are connected to each other by a cylinder head flange so that each air passage of the intake manifold is in fluid-conductive connection with its associated intake passage in the cylinder head. A flap valve which constricts the cross section of the air passage as desired is provided in the air passage of the intake manifold.

An intake passage system for an internal combustion engine with two intake passages per cylinder in one cylinder head is known from DE 3,836,550 C2. A flap valve, which completely closes one of the two intake passages as a function of the operating state of the internal combustible engine, is provided in an air intake manifold of the intake passage system. This system, however, suffers from the disadvantage that the wall separating the two passages must be designed to fit the flap valve with very close tolerances, and also the flap valve assembly must itself be fabricated with very close tolerances, so that one or the other of the two intake passages is sealed off completely. In addition, it is possible for one of the passages only to be opened or closed completely with this system. It is impossible to adjust the air flow in one passage. Furthermore, because of the manufacturing tolerances involved, the undesirable situation arises that only some of the flap valves, in the least favorable case only one valve, completely closes its intake passage, whereas the other valves leave a small gap. DE 3,522,991 A1 describes an internal combustion engine with an intake passage, where a swirl valve is provided in a rectangular section of the intake passage. Under certain operating conditions, an exception being operation at full load, this valve is opened in such a way that it produces a turbulent swirl flow into one of the cylinders of the engine. This design, however, is complicated, because each swirl valve must be controlled individually. In an alternative which is also mentioned, the air stream itself pushes the valve down to a greater or lesser degree. This suffers from the significant disadvantage, however, that, because the air stream must perform work, energy which would otherwise be available to the air stream itself is lost.

SUMMARY OF THE INVENTION

The present invention therefore has the task of making available an air intake system of the type described above which overcomes the disadvantages described above and which also makes it possible to shut off part of an intake passage, thus providing the opportunity to influence the movement of the charge into the combustion chamber of the internal combustion engine.

It is thus provided according to the invention that a partition wall is installed in the intake passage to divide the intake passage over a predetermined distance between the cylinder head flange and the intake port. Furthermore, the flap valve is designed in such a way and installed so as to project out over the cylinder head flange so that it strikes the partition wall when it is in the position where it constricts the cross section of the air passage.

This offers the advantage that, instead of the intake passage being completely closed off, the cross section of the air passage and that of the associated intake passage, under inclusion of the tumble plate, are merely constricted, so that, with a constant number of active intake passages, it becomes possible to influence the movement of the charge into the combustion chambers of the internal combustion engine in the desired manner.

All the flap valves can be actuated in common by providing a flap valve shaft in a wall of the intake manifold, to which shaft the flap valves of all the cylinders are connected, preferably by welding.

A fuel injection system which is simple and inexpensive with respect to both fabrication and assembly is obtained by providing a fuel injection device for each cylinder, by providing each of the fuel injection devices with a seat, which is designed to hold at least part of the fuel injection device, and by providing a fuel passage in the intake manifold, this fuel passage being connected to all the seats holding the fuel injection devices.

Because each flap valve is designed as a spring plate, these plates give way elastically after coming to rest against the partition wall until all of the flap valves have made contact with their associated partition walls. Thus, regardless of the angular tolerances present affecting the various flap valves of the cylinders, all of the flap valves will always seal off their section of the intake passage with the tightest possible seal.

Disturbances in the air flow in the air passage and in the intake passage caused by the flap valve are prevented by providing a recess in one of the walls of the air passage and/or in one of the walls of the intake passage. This recess is designed to accept at least part of the flap valve when the flap valve is in the position where it leaves the air passage and the intake passage completely open.

It is possible to obtain a good seal on one side of the partition wall despite a wide range of tolerances by bending the free end of the flap valve, i.e., the end which strikes the partition wall, by a predetermined angle.

BRIEF DESCRIPTION OF THE DRAWINGS

Additional features, advantages, and advantageous embodiments of the invention can be derived from the dependent claims and from the following description of the invention, which is based on the attached drawings:

DETAILED DESCRIPTION OF THE PREFERRED EMBODIMENTS

Figure 1:
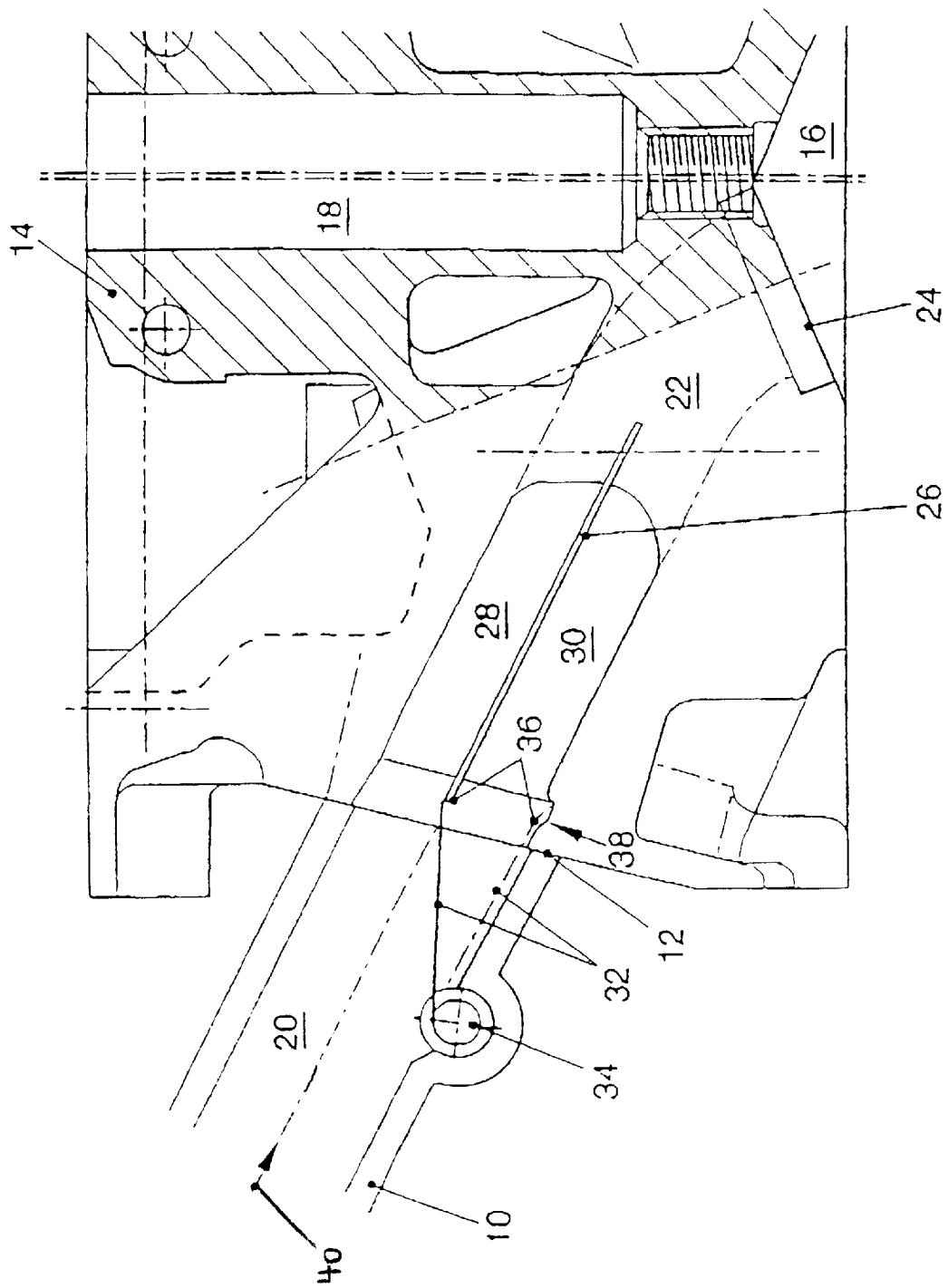
FIG. 1 is a sectional view of a schematic diagram of an air intake system according to the invention.

As can be seen from the schematic diagram according to FIG. 1, an air intake system according to the invention comprises an intake manifold, i.e., the bottom part 10 of an intake manifold, which is connected by a cylinder head flange 12 to a cylinder head 14. The cylinder head 14 forms a boundary of a combustion chamber 16 of a cylinder (not shown) and has a seat 18 for a spark plug (not shown). The bottom part 10 of the intake manifold forms an air passage 20, which is in fluid-conductive connection with an intake passage 22 in the cylinder head 14. The intake passage 22 leads to an intake port 24 of the combustion chamber 16 of the associated cylinder. In the intake passage 22 of the cylinder head 14, a partition wall 26 is provided, which divides the intake passage 22 into two passages 28, 30 over predetermined distance between the cylinder head flange 12 and the intake port 24.

A flap valve 32 is mounted on a flap valve shaft 34 in the bottom part 10 of the intake manifold so that it can be swivelled as desired between an open state, indicated in broken line, and a closed state, as indicated in solid line. In the open state, the cross sections of the air passage 20 and of the intake passage 22 are completely open, so that, for example, when the internal combustion engine connected to the air intake system is operating at full load, the cylinder or cylinders can be provided with the maximum charge. In the partial load or no-load state of the internal combustion engine, however, the flap valve 32 is moved to a closed position, in which its free end 36 rests against the partition wall 26 and thus closes off the partial passage 30. As a result, the effective cross section of the air passage 20 and thus also of the intake passage 22 is constricted in such a way that a predetermined flow is obtained at the intake port 24, which, even in the partial load state or in the no-load state of the internal combustion engine, ensures sufficient movement of the charge into the cylinder.

The flap valve 32 projects across the cylinder head flange 12 into the intake passage 22, and the free end 36 of the flap valve is slightly bent. Thus, it is possible for the flap valve to give way elastically under the effect of the torque being exerted on it by the flap valve shaft 34 until all of the flap valves 32 of the various cylinders mounted on the flap valve shaft 34 have come to rest against their partition walls. In this way, the design according to the invention becomes insensitive to manufacturing tolerances and to differences in the angular positions of the various flap valves 32 on the flap valve shaft 34. In other words, in the closed position, all the flap valves 32 of a flap valve shaft 34 tightly close off part of the cross section of the air passage 20 and thus of intake passage 22 at the partition wall 26, because the flap valve shaft 34 keeps turning until the last flap valve 32 comes to rest against the partition wall 26.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The intake passage 22 has a recess 38 in the area in contact with the flap valve 32 when the valve is in the open state, into which recess the bent end 36 fits. In this way, there is a minimum of interference with the air stream 40 in the intake passage 22. The flap valve shaft 34 is also at least partially recessed into the wall of the bottom part 10 of the intake manifold, so that the shaft also produces the minimum amount of interference with the air flow 40 in the intake passage 22.

Figure 2:
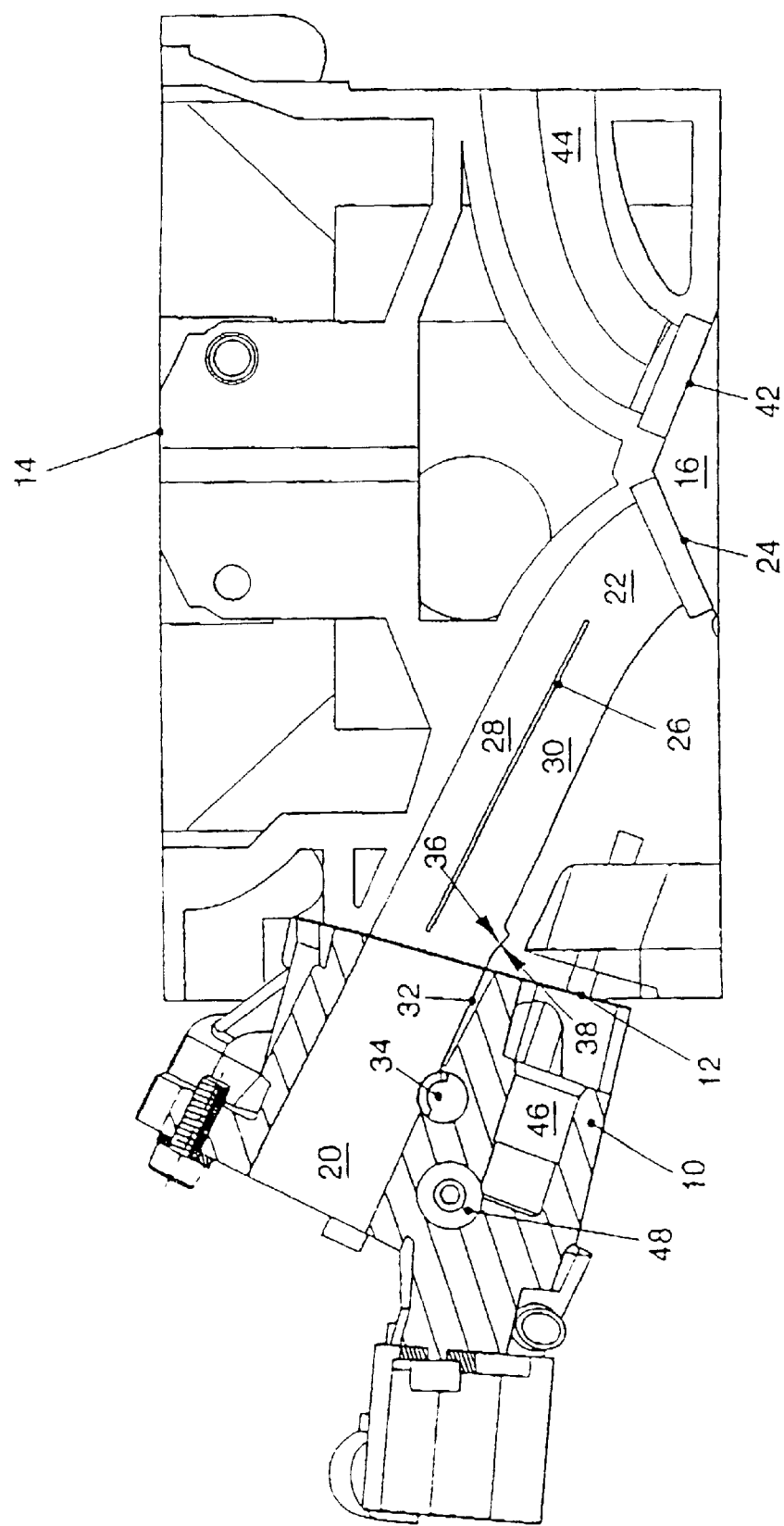
FIG. 2 is a sectional view of a preferred embodiment of an air intake system according to the invention.

FIG. 2 shows a preferred embodiment of an air intake system designed in accordance with the invention, where parts which are the same as those described above have been given the same reference numbers, so that reference can be made in their cases to the explanation given in connection with the description of FIG. 1. In FIG. 2, we can see in addition an exhaust port 42 with an exhaust passage 44 for hot exhaust gases and a seat 46 for a fuel injection valve (not shown). Each cylinder has its own fuel injection valve, and a common fuel passage 48 is provided in the bottom part 10 of the intake manifold, serving all of the fuel injection valves, this common passage being in fluid-conductive connection with all the seats for the fuel injection valves. The bottom part 10 of the intake manifold thus combines the devices for air intake and those of fuel injection in a single component.

Figure 3:
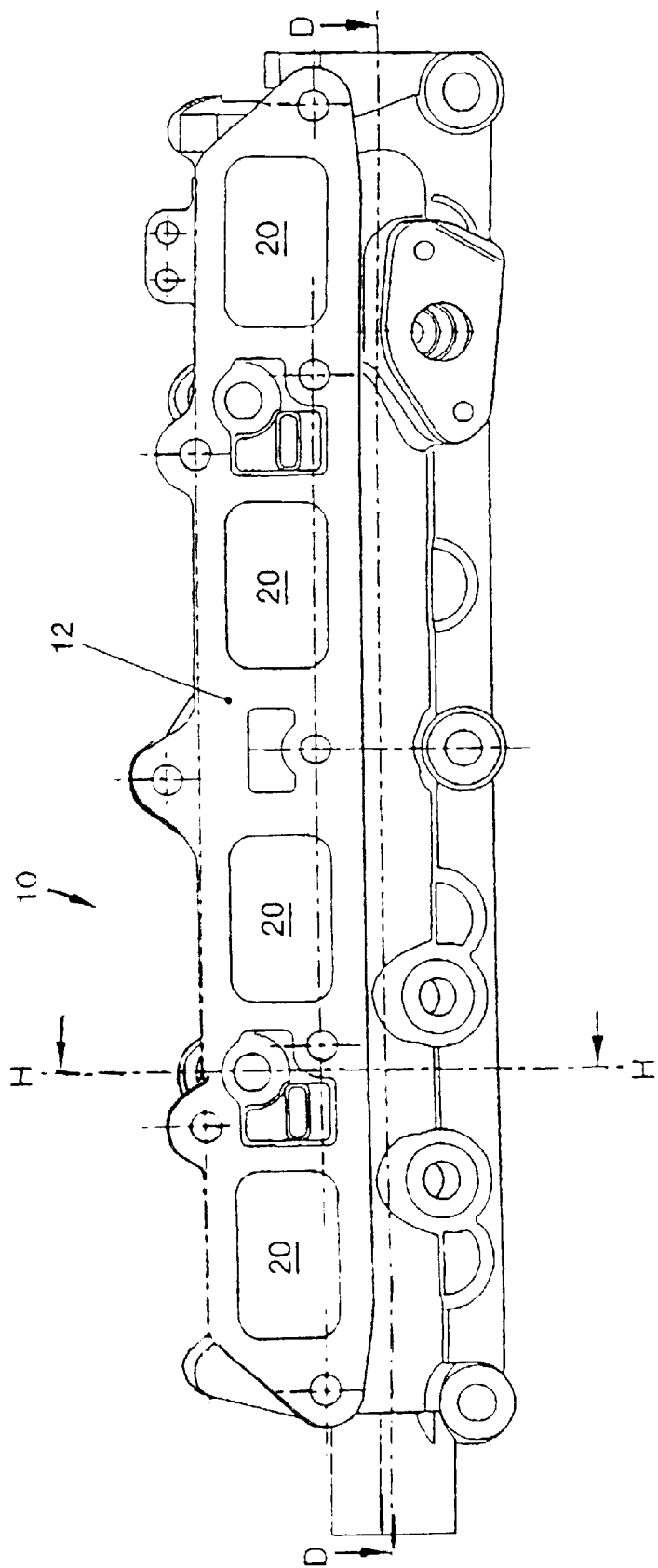
FIG. 3 is an underside view of the bottom part of an intake manifold of an intake system according to the invention.
Figure 4:
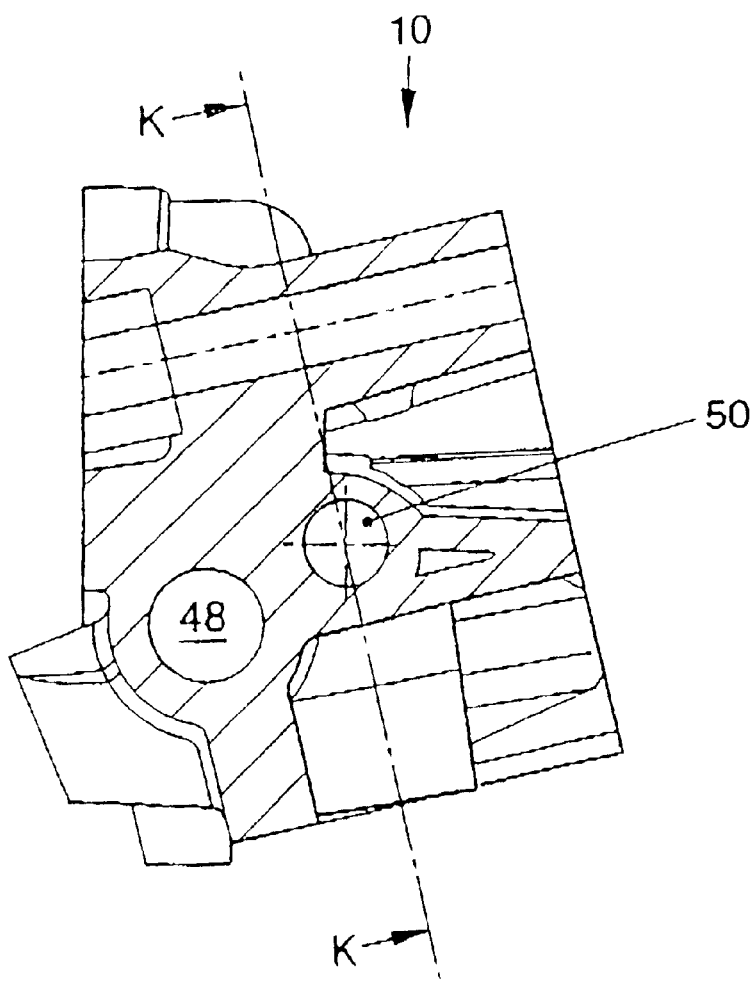
FIG. 4 is a sectional view along line H—H of FIG. 3.
Figure 5:
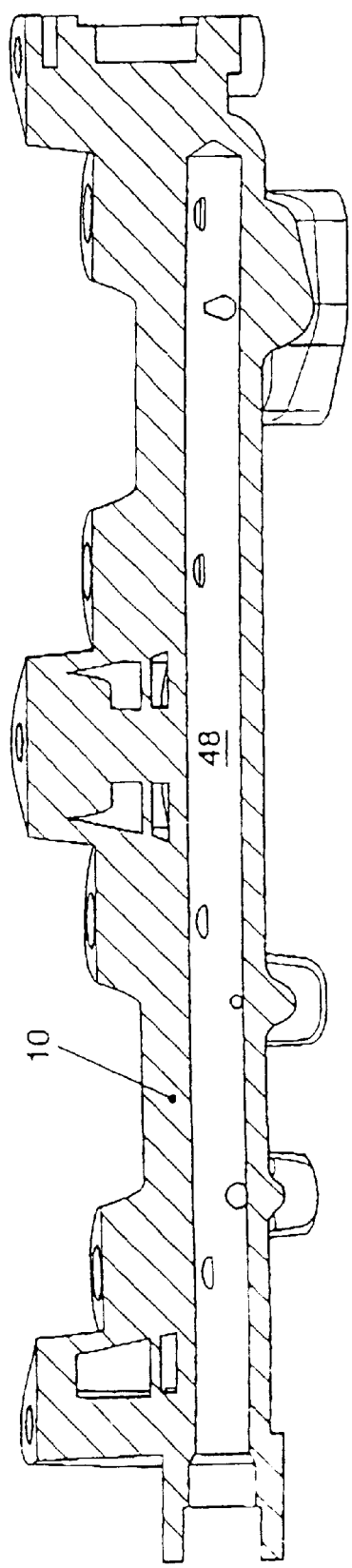
FIG. 5 is a sectional view along line D—D of FIG. 3.
Figure 6:
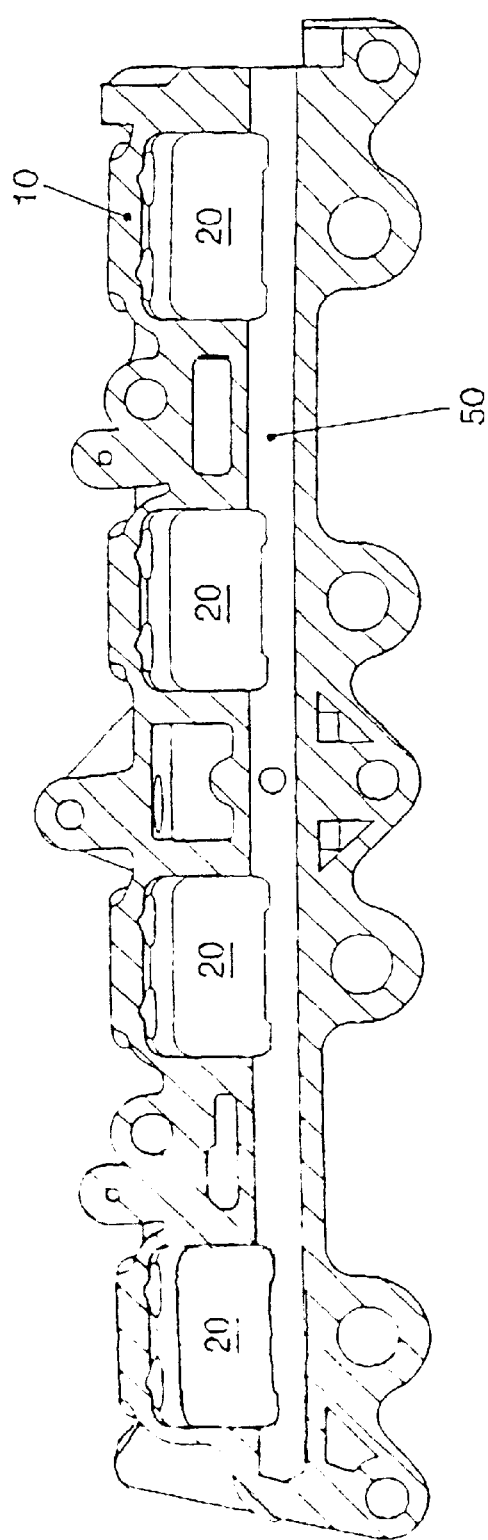
FIG. 6 is a sectional view along line K—K of FIG. 4.

As already explained above, a flap valve 32 is provided in each air passage 20, i.e., in each intake passage 22, of each cylinder of an otherwise not shown internal combustion engine, all of these valves being connected to the same flap valve shaft 34. FIGS. 3–6 show various views of a preferred design of the bottom part 10 of an intake manifold for four cylinders; that is, four air passages 20 are provided in correspondence with the number of cylinders. FIG. 3 shows the flange 12, by which the bottom part 10 of the intake manifold is connected to the cylinder head 14. An opening 50 for the flap valve shaft 34 and the fuel passage 48 can be seen in FIGS. 4–6.

What is claimed is:

1. An air intake system for an internal combustion engine, the intake system comprising: a cylinder head delimiting at least one cylinder; an intake manifold which has at least one air passage per cylinder; at least one intake passage in the cylinder head per cylinder, with an intake port leading into the associate cylinder, the intake manifold having a cylinder head flange connected to the cylinder head so that each air passage of the intake manifold is in fluid-conductive connection with an associated intake passage in the cylinder head; a flap valve operatively arranged in the air passage of the intake manifold so as to constrict a cross section of the air passage of the intake manifold; and a partition wall arranged in the intake passage so as to divide the intake passage over a predetermined distance between the cylinder head flange and the intake port, the flap valve being movable between an open position and a closed position, the flap valve being configured so as to project over the cylinder head flange so that the flap valve strikes the partition wall when the flap valve is in the closed position in which the flap valve constricts the cross section of the air passage of the intake manifold.

2. An intake system according to claim 1, and further comprising a flap valve shaft provided in a wall of the intake manifold, the flap valves of all the cylinders being connected to the flap valve shaft.

3. An air intake system according to claim 1, and further comprising a fuel injection device for each cylinder, the intake manifold having seats configured to hold at least part of each of the fuel injection devices, the intake manifold further having a fuel passage in fluid communication with all the seats of the fuel injection devices.

4. An air intake system according to claim 1, wherein the flap valve is a spring plate.

5. An air intake system according to claim 1, wherein a recess is provided in at least one of a wall of the air passage and a wall of the intake passage, the recess being configured to hold at least part of the flap valve when the valve is in the open position in which the valves leaves the air passage and the intake passage completely open.

6. An air intake system according to claim 1, wherein the flap valve is bent by a certain angle at its free end which comes in contact with the partition wall.

7. An air intake system according to claim 2, wherein the flap valves are welded to the flap shaft.

* * * * *